(12) United States Patent
Golikov et al.

(10) Patent No.: US 12,315,508 B2
(45) Date of Patent: *May 27, 2025

(54) SELECTIVELY ACTIVATING ON-DEVICE SPEECH RECOGNITION, AND USING RECOGNIZED TEXT IN SELECTIVELY ACTIVATING ON-DEVICE NLU AND/OR ON-DEVICE FULFILLMENT

(71) Applicant: GOOGLE LLC, Mountain View, CA (US)

(72) Inventors: Michael Golikov, Merlischachen (CH); Zaheed Sabur, Baar (CH); Denis Burakov, Zurich (CH); Behshad Behzadi, Freienbach (CH); Sergey Nazarov, Zurich (CH); Daniel Cotting, Islisberg (CH); Mario Bertschler, Zurich (CH); Lucas Mirelmann, Zurich (CH); Steve Cheng, Los Altos, CA (US); Bohdan Vlasyuk, Zurich (CH); Jonathan Lee, Brooklyn, NY (US); Lucia Terrenghi, Zurich (CH); Adrian Zumbrunnen, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/970,894

(22) Filed: Oct. 21, 2022

(65) Prior Publication Data
US 2023/0041517 A1    Feb. 9, 2023

Related U.S. Application Data

(63) Continuation of application No. 16/621,540, filed as application No. PCT/US2019/034917 on May 31, 2019, now Pat. No. 11,482,217.
(Continued)

(51) Int. Cl.
*G10L 15/22* (2006.01)
*G01D 21/02* (2006.01)
(Continued)

(52) U.S. Cl.
CPC .............. *G10L 15/22* (2013.01); *G01D 21/02* (2013.01); *G06F 3/167* (2013.01); *G10L 15/063* (2013.01);
(Continued)

(58) Field of Classification Search
CPC ... G10L 15/22; G10L 15/063; G10L 15/1815; G10L 15/183; G10L 25/78; G10L 2015/223; G01D 21/02; G06F 3/167
See application file for complete search history.

(56) References Cited

U.S. PATENT DOCUMENTS

| 5,548,681 A | 8/1996 | Gleaves et al. |
| 6,233,559 B1 | 5/2001 | Balakrishnan |

(Continued)

FOREIGN PATENT DOCUMENTS

| CN | 105009203 | 10/2015 |
| CN | 105204628 | 12/2015 |

(Continued)

OTHER PUBLICATIONS

Intellectual Property India; Examination Report issued in Application No. 202127045735; 8 pages; dated Apr. 29, 2022.
(Continued)

*Primary Examiner* — Darioush Agahi
(74) *Attorney, Agent, or Firm* — Gray Ice Higdon

(57) ABSTRACT

Implementations can reduce the time required to obtain responses from an automated assistant by, for example, obviating the need to provide an explicit invocation to the automated assistant, such as by saying a hot-word/phrase or performing a specific user input, prior to speaking a com- (Continued)

mand or query. In addition, the automated assistant can optionally receive, understand, and/or respond to the command or query without communicating with a server, thereby further reducing the time in which a response can be provided. Implementations only selectively initiate on-device speech recognition responsive to determining one or more condition(s) are satisfied. Further, in some implementations, on-device NLU, on-device fulfillment, and/or resulting execution occur only responsive to determining, based on recognized text form the on-device speech recognition, that such further processing should occur. Thus, through selective activation of on-device speech processing, and/or selective activation of on-device NLU and/or on-device fulfillment, various client device resources are conserved.

18 Claims, 7 Drawing Sheets

Related U.S. Application Data

(60) Provisional application No. 62/843,866, filed on May 6, 2019.

(51) Int. Cl.
| | | |
|---|---|---|
| *G06F 3/16* | (2006.01) | |
| *G10L 15/06* | (2013.01) | |
| *G10L 15/18* | (2013.01) | |
| *G10L 15/183* | (2013.01) | |
| *G10L 25/78* | (2013.01) | |

(52) U.S. Cl.
CPC ........ *G10L 15/1815* (2013.01); *G10L 15/183* (2013.01); *G10L 25/78* (2013.01); *G10L 2015/223* (2013.01)

(56) References Cited

U.S. PATENT DOCUMENTS

| | | | |
|---|---|---|---|
| 9,697,828 B1 | 7/2017 | Prasad et al. | |
| 9,997,086 B1 | 6/2018 | Braden | |
| 10,235,999 B1 | 3/2019 | Naughton | |
| 10,515,625 B1 | 12/2019 | Metallinou et al. | |
| 10,984,782 B2* | 4/2021 | Finkelstein | G06N 20/00 |
| 2009/0018828 A1 | 1/2009 | Nakadai et al. | |
| 2013/0315038 A1* | 11/2013 | Ferren | H04N 5/44504 |
| | | | 367/197 |
| 2014/0058732 A1* | 2/2014 | Labsky | G10L 15/30 |
| | | | 704/E15.005 |
| 2014/0214421 A1* | 7/2014 | Shriberg | G10L 25/87 |
| | | | 704/243 |
| 2014/0274203 A1* | 9/2014 | Ganong, III | G10L 15/02 |
| | | | 455/563 |
| 2015/0109191 A1 | 4/2015 | Johnson et al. | |
| 2015/0363393 A1 | 12/2015 | Williams et al. | |
| 2016/0217789 A1 | 7/2016 | Lee et al. | |
| 2017/0270929 A1 | 9/2017 | Aleksic et al. | |
| 2018/0039478 A1* | 2/2018 | Sung | G10L 15/1822 |
| 2018/0053507 A1* | 2/2018 | Wang | G10L 15/18 |
| 2018/0061400 A1 | 3/2018 | Carbune et al. | |
| 2018/0324115 A1 | 11/2018 | Aggarwal et al. | |
| 2019/0066680 A1 | 2/2019 | Woo et al. | |
| 2019/0114543 A1* | 4/2019 | Chen | G06N 3/08 |
| 2020/0012916 A1* | 1/2020 | Dolignon | G06N 3/006 |
| 2020/0273486 A1* | 8/2020 | Ganor | G10L 25/84 |
| 2020/0335088 A1* | 10/2020 | Gao | H04R 3/04 |
| 2020/0349966 A1 | 11/2020 | Konzelmann et al. | |
| 2021/0074285 A1 | 3/2021 | Golikov et al. | |

FOREIGN PATENT DOCUMENTS

| | | |
|---|---|---|
| CN | 107310476 | 11/2017 |
| CN | 107832036 | 3/2018 |
| CN | 108235745 | 6/2018 |
| CN | 109285547 | 1/2019 |
| WO | 2018031745 | 2/2018 |

OTHER PUBLICATIONS

European Patent Office; International Search Report and Written Opinion issued in Ser. No. PCT/US2019/034917; 15 pages; dated Jan. 29, 2020.
European Patent Office; Communication pursuant to Article 64(3) EPC issued in Application No. 19731537.7; 8 pages; dated Dec. 14, 2022.
European Patent Office; Summons issued in Application No. 19731537.7; 8 pages; dated Jan. 11, 2024.
China National Intellectual Property Administration; Notification of Second Office Action issued in Application No. 201980096036.5, 31 pages; dated Jan. 25, 2024.
China National Intellectual Property Administration; Notification of First Office Action issued in Application No. 201980096036.5; 31 pages; dated Jun. 12, 2023.
European Patent Office; Result of Consultation issued in Application No. 19731537.7; 3 pages; dated May 21, 2024.
European Patent Office; Intention to Grant issued in Application No. 19731537.7; 63 pages; dated Jun. 5, 2024.
European Patent Office; Communication issued in Application No. 24212244.8; 9 pages; dated Jan. 23, 2025.
Mallidi, S.H. et al.; Device-directed Utterance Detection; Amazon; 4 pages; dated Aug. 2018.

\* cited by examiner

SELECTIVELY ACTIVATING ON-DEVICE SPEECH RECOGNITION, AND USING RECOGNIZED TEXT IN SELECTIVELY ACTIVATING ON-DEVICE NLU AND/OR ON-DEVICE FULFILLMENT

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual user interface output.

As mentioned above, many automated assistants are configured to be interacted with via spoken utterances. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives input from the user, and provides audible and/or graphical responses), and that interfaces with one or more additional components that implement the automated assistant (e.g., on-device component(s) and/or remote server device(s) that process user inputs and generate appropriate responses).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more particular spoken invocation phrases, which are also known as "hot-words/phrases" or "trigger words/phrases". For example, a particular spoken invocation phrase such as "Hey Assistant," "OK Assistant", and/or "Assistant" can be spoken to invoke an automated assistant. When an automated assistant is invoked using such user interface input(s), detected audio data is typically streamed from the client device to remote automated assistant component(s) that typically indiscriminately perform each of speech recognition, natural language understanding, and fulfillment (or at least attempt fulfillment).

SUMMARY

Various implementations disclosed herein may serve to reduce the time required to obtain responses/fulfillment from an automated assistant. This is not least because such implementations may obviate the need for the user to provide an explicit invocation to the automated assistant, such as by saying a hot-word/phrase or performing a specific user input, prior to speaking a command or query. In addition, in certain implementations, the automated assistant may receive, understand and, in some instances, respond to/fulfill the command or query without communicating with a server, thereby further reducing the time in which a response/fulfillment can be provided.

Implementations disclosed herein are directed to client devices (e.g., smartphones and/or other client devices) that include at least one or more microphones and an automated assistant application. The automated assistant application can be installed "on-top of" an operating system of the client device and/or can itself form part of (or the entirety of) the operating system of the client device. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the client device. The on-device speech recognition generates recognized text for a spoken utterance (if any) present in the audio data. Optionally, on-device speech recognition can validate that the recognized text corresponds to the currently active (or only) profile of the client device (e.g., using text-independent speaker identification/recognition described below). Also, for example, on-device natural language understanding (NLU) can be performed using an on-device NLU module that processes recognized text, generated using the on-device speech recognition, and optionally contextual data, to generate NLU data. NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

Despite the advantages afforded by on-device speech recognition, on-device NLU, and on-device fulfillment, it is burdensome to resources of the client device to continuously execute all on-device processes and/or such continuous executing can compromise security/privacy of user data. For example, it can burden processor resources and power resource(s) (e.g., a battery when the client device is powered by a battery) to continuously run all on-device processes. Moreover, if NLU and/or fulfillment are indiscriminately performed on recognized text from all detected spoken utterances, fulfillments (and resulting executions) may inadvertently occur for some spoken utterances despite there being no user intent to have the automated assistant perform any responsive action for those spoken utterances. Such inadvertent fulfillments and resulting executions can also cause undue consumption of various client device resources, in addition to potentially compromising security of user data.

In view of these and/or other considerations, implementations disclosed herein only selectively initiate on-device speech recognition. For example, various implementations initiate on-device speech recognition only responsive to determining one or more condition(s) are satisfied. Further, in some of those implementations, on-device NLU, on-device fulfillment (and/or resulting execution) occur only responsive to determining, based on recognized text from the on-device speech recognition, that such further processing should occur. Thus, through the selective activation of on-device speech processing, and/or the further selective activation of on-device NLU and/or on-device fulfillment, various client device resources are conserved and/or security of user data is maintained.

In various implementations, on-device speech recognition is activated responsive to detecting occurrence of an explicit assistant invocation cue. An explicit invocation cue is one that, when detected in isolation, will always cause at least on-device speech recognition to be activated. Some non-limiting examples of explicit invocation cues include detecting a spoken hot-word with at least a threshold degree of confidence, an actuation of an explicit assistant interface element (e.g., hardware button or graphical button on a touch-screen display), a "phone squeeze" with at least threshold strength (e.g., as detected by sensor(s) in a bezel of a mobile phone), and/or other explicit invocation cue(s).

However, other cue(s) are implicit in that on-device speech recognition will only be activated responsive to some occurrences of those cue(s) such as occurrence(s) in certain context(s) (e.g., occurrence(s) following or in combination with other implicit cue(s)). For example, on-device speech recognition can optionally not be activated responsive to detecting voice-activity standing alone, but may be activated responsive to detecting voice activity along with detecting, at the client device, user presence and/or detecting, at the client device, user presence within a threshold distance. User presence and/or distance of a user can optionally be determined using one or more non-microphone sensor(s) such as a passive infrared (PIR) sensor and/or a laser-based sensor. Also, for example, sensor data from non-microphone sensor(s) such as gyro(s), accelerometer(s), magnetometer(s), and/or other sensor(s), that indicate a user has picked up the client device and/or is currently holding the client device can optionally not, standing alone, activate on-device speech recognition. However, on-device speech recognition may be activated in response to such indications along with detecting voice activity and/or directed speech (described in more detail herein) in hot-word free audio data. Hot-word free audio data is audio data that lacks any spoken utterance that includes a hot-word that is an explicit assistant invocation cue. As yet another example, a "phone squeeze" with less than the threshold strength can optionally, standing alone, be insufficient to activate on-device speech recognition. However, on-device speech recognition may be activated in response to such a low strength "phone squeeze" along with detecting voice activity and/or directed speech in hot-word free audio-data. As yet another example, on-device speech recognition can optionally not be activated responsive to detecting voice-activity standing alone, but may be activated responsive to detecting voice activity along with text-independent speaker identification/recognition (also described below). As yet another example, on-device speech recognition can optionally not be activated responsive to detecting directed gaze (described below) standing alone, but may be activated responsive to detecting directed gaze along with voice activity, directed speech, and/or text-independent speaker identification/recognition. As yet another example, on-device speech recognition can optionally not be activated responsive to detecting directed gaze for less than a threshold quantity of (and/or percentage of) consecutive image frames (i.e., a transient directed gaze), but may be activated responsive to detecting directed gaze for at least the threshold quantity and/or percentage of consecutive image frames (i.e., an enduring directed gaze). Although several examples are provided above, additional and/or alternative implicit invocation cue(s) can be provided. Moreover, in various implementations one or more implicit cue(s) described above can optionally alternatively be an explicit invocation cue. For example, in some implementations sensor data from non-microphone sensor(s) such as gyro(s), magnetometer(s), and/or accelerometer(s) that indicate a user has picked up the client device and/or is currently holding the client device can optionally, standing alone, activate on-device speech recognition Some implementations disclosed herein relate to determining whether to activate on-device speech recognition based on one or more implicit cues, such as those described above. In some of those implementations, the determination is made based on on-device processing of hot-word free audio data and/or additional sensor data that is based on output from one or more non-microphone sensor(s) of the client device. Those implementations enable interaction of a user with an automated assistant to be initiated and/or guided without the user needing to preface such interaction with utterance of a hot-word and/or with other explicit invocation cue. This enables reduced user input to be provided by the user (at least due to omission of the hot-word or other explicit invocation cue), which directly lessens the duration of the interaction and thereby may reduce time-to-fulfillment and conserve various local processing resources that would otherwise be utilized in a prolonged interaction The on-device processing that is performed on the hot-word free audio data in determining whether to activate on-device speech recognition can include, for example, voice activity processing, directed speech processing, and/or text-independent speaker identification.

Voice activity processing processes audio data (e.g., the raw audio data or a Mel-frequency cepstral coefficients (MFCCs) or other representation of the audio data) to monitor for the occurrence of any human speech and can output a voice activity metric that indicates whether voice activity is present. The voice activity metric can be a binary metric, or a probability of there being human speech in the audio data.

Directed speech processing can utilize a trained acoustic model that is trained to differentiate between spoken utterances that are directed to a client device and spoken utterances that are not directed to a client device. For example, instances of users speaking to an automated assistant can be labeled with a first label (e.g., a "1"), and instances of users speaking to other human(s) can be labeled with a second label (e.g., a "0"). This is effective, as the audio data itself can indicate whether the input is intended as an assistant input as user's often speak with different voice attribute(s) (e.g., inflection, tone, cadence) when speaking to an assistant device, as compared to those voice attribute(s) when speaking to another human. Accordingly, instead of differentiating between human speech and no human speech, directed speech processing seeks to differentiate between human speech that is directed to a client device and human speech that is not directed to a client device (e.g., human speech directed to another human, human speech emanating from a television or other source). Directed speech processing using the acoustic model can result in a directed speech metric that indicates whether human speech is detected that is directed to a client device and can be a binary metric, or a probability.

Text-independent speaker identification/recognition (TI-SID) processes audio data using a TI-SID model to generate an embedding for a spoken utterance captured by the audio data, and compares the embedding to locally stored embedding(s) for one or more user accounts/profiles registered with the client device. A TI-SID metric can then be generated based on the comparison, where the TI-SID metric indicates whether the generated embedding matches one of the stored embedding(s) and/or a degree to which they match.

The additional sensor data that is based on output from one or more non-microphone sensor(s) of the client device and processed in determining whether to activate on-device speech recognition can include sensor data from gyroscope(s), accelerometer(s), laser-based vision sensor(s), camera(s), and/or other sensor component(s) of the client device. The raw sensor data itself can be processed, or abstractions or other representations of the raw sensor data, such as abstractions provided by the operating system of the client device. For example, representations of accelerometer sensor data can be provided and utilized, and/or an indication from the operating system that the client device has been picked up (where the indication can be determined by the operating system based on sensor data from one or more sensor(s)).

In some implementations, various metric(s) (e.g., from processing of hot-word free audio data) and/or sensor data (e.g., representations or abstractions thereof) can be processed by an attention handler in determining whether to activate on-device speech recognition. The attention handler can utilize one or more rules and/or an attention model in determining whether to activate the on-device speech recognition. The attention model can be a machine learning model trained, for example, based on supervised and/or semi-supervised training examples. For example, semi-supervised training examples can have training example inputs that are based on audio data and/or additional sensor data from actual interactions of participating users, with permission from those participating users. Further, the semi-supervised training examples can be labeled as "positive" (i.e., on-device speech recognition should occur) responsive to detecting a directed gaze co-occurs with such data, with permission from participating users. The semi-supervised training examples can be labeled as "negative" (i.e., on-device speech recognition should not occur) responsive to detecting a directed gaze does not co-occur with such data, with permission from participating users. A directed gaze is a gaze that is directed at the client device (e.g., for a threshold duration and/or for at least a threshold percentage of sensor frames), as determined based on sensor frames from vision sensor(s) of the client device (e.g., image frames form a camera). Presence of a directed gaze does not necessarily indicate that the user is intending to interact with the automated assistant (e.g., the user may just be intending to interact with the client device generally). However, using a directed gaze (or other signal(s)) as a supervision signal can ensure sufficient activation of the on-device speech recognition to ensure spoken utterances are recognized, and with the recognition that additional technique(s) described herein will prevent on-device NLU and/or on-device fulfillment in situation(s) in which interaction with the automated assistant is not intended. In these and other manners, through utilization of a trained attention model, on-device speech recognition can be selectively activated in response to occurrence of one or more implicit invocation cue(s), as well as in response to occurrence of an explicit invocation cue. In various implementations, on-device training of the attention model can occur to personalize the attention model to the client device and/or to provide gradient(s) (from the training) for utilization in federated learning (e.g., to further train an attention model based on gradients from multiple client devices, and provide the further trained model for utilization). When on-device training occurs, directed gaze and/or other signal(s) can be utilized as a supervision signal for the training.

Once on-device speech recognition has been activated, whether responsive to implicit or explicit cue(s) such as those described herein, audio data is processed using the on-device speech recognition to determine recognized term(s) in a spoken utterance (if any) captured by the audio data. The audio data processed can include audio data captured after the on-device speech recognition is activated, and optionally locally buffered recent audio data (e.g., 3 seconds or other duration of locally buffered recent audio data). In some implementations, when on-device speech recognition is activated, human perceptible cue(s) are rendered to inform the user that such activation has occurred and/or to render a stream of the recognized text as the recognition is occurring. The human perceptible cue(s) can include, for example, a visual rendering of at least the stream of the recognized text on a touch-screen display of the client device (e.g., a visual rendering at the bottom of the display), optionally overlaid on any active content (and optionally semi-transparently presented). The visual rendering can also include a selectable "cancellation" element that, when selected via touch input at the touch-screen display, halts the on-device speech recognition. As described herein, the human perceptible cue can optionally be further adapted when on-device NLU and/or on-device fulfillment are activated, and/or responsive to execution of the fulfillment.

Various implementations described herein further relate to determining whether to activate on-device NLU and/or on-device fulfillment (and/or resulting execution). In some of those implementations, on-device NLU and/or on-device fulfillment occur only responsive to determining, based at least in part on recognized text from the on-device speech recognition, that such further processing should occur. Through such selective activation of on-device speech processing, and/or the further selective activation of on-device NLU and/or on-device fulfillment, various client device resources are conserved and/or security of user data is maintained.

In some implementations, determining whether to activate on-device NLU and/or on-device fulfillment can be based on determining whether the recognized text matches one or more phrases stored in a locally stored assistant language model. On-device NLU and/or on-device fulfillment are more likely to be activated when the recognized text matches phrase(s) stored in the locally stored assistant language model. Soft matching or exact matching can be utilized. The locally stored assistant language model can include a plurality of phrases that are each interpretable and actionable by an automated assistant, and can exclude any phrases that are not interpretable and actionable by an automated assistant. A phrase can be interpretable and actionable by an automated assistant if the phrase results in fulfillment that is not a "punt" such as "sorry, I can't help with that", an "error tone", or other non-substantive response. The assistant language model can be generated to include phrases that were previously issued to an automated assistant and successfully actioned by the automated assistant. Optionally, in view of storage constraints of client devices, the assistant language model can be restricted to a certain quantity of phrases, and the included phrases can be selected for inclusion based on frequency of use and/or other consideration(s).

In some implementations determining whether to activate on-device NLU and/or on-device fulfillment can additionally or alternatively be based on determining one or more related action phrases based on the one or more related action phrases each having a defined correspondence to a recent action performed, at and/or via the client device, responsive to prior user input—and determining whether at least part of the recognized text matches at least one of the one or more related action phrases. On-device NLU and/or on-device fulfillment are more likely to be activated when the recognized text matches the related action phrase(s). Soft matching or exact matching can be utilized. As one example, if the recent action is turning on smart lights, related action phrases such as "dim" and/or "turn off" can be determined, thereby promoting on-device NLU and/or on-device fulfillment for hot-word free follow-up spoken utterances such as "dim them to 50%". As another example, if the recent action was setting an alarm for a specific time, follow-up action phrases can include "times" generally, thereby promoting on-device NLU and/or on-device fulfillment for hot-word free follow-up spoken utterances such as "actually, make it for 8:05 AM".

In some implementations, determining whether to activate on-device NLU and/or on-device fulfillment can additionally or alternatively be based on determining whether at least part of the recognized text conforms to content being rendered at the client device during the spoken utterance. For example, if a suggested automated assistant action of "turn up the volume" is being visually displayed during the spoken utterance, recognized text that includes "turn up" and/or "volume" can be determined to conform to the visually rendered content, and on-device NLU and/or on-device fulfillment more likely to be activated. As another example, if an image and/or textual description of a given entity is being rendered, recognized text that includes an alias of the given entity, an attribute of the given entity, and/or attribute of an additional entity, that is related to the given entity, can be determined to conform to the visually rendered content. For instance, if content pertaining to a particular network router is being rendered, recognized text that includes an alias (e.g., make and/or model number) of the router, attributes of the router (e.g., 802.11ac compliant), and/or an attribute of a related entity (e.g., modem) can be determined to conform to the visually rendered content.

In some implementations, determining whether to activate on-device NLU and/or on-device fulfillment can additionally or alternatively be based on determining whether at least part of the recognized text conforms to a non-automated assistant application that is executing during the spoken utterance. For example, if the recognized text conforms to action(s) that are applicable to an application executing in the foreground of the client device during the spoken utterance, on-device NLU and/or on-device fulfillment can be more likely to be activated. For instance, if a messaging application is executing in the foreground, recognized text that includes "reply with", "send" and/or other text related to the messaging application can be considered to conform to action(s) performable by the non-automated assistant application. Optionally, where multiple action(s) are performable by the non-automated assistant application, but only a subset of those action(s) are performable at a current state of the non-automated assistant application, that subset can be the only action(s) considered or can be weighted more heavily (than action(s) not in the subset) in the determination. As described herein, in some implementations where recognized text relates to an executing non-automated assistant application, the fulfillment that is determined based on the spoken utterance can be a fulfillment that includes the automated assistant application interfacing (directly or via the operating system) with the non-automated assistant application to cause the non-automated assistant application to execute an action that conforms to the spoken utterance. For example, a spoken utterance of "reply with sounds great" can result in the automated assistant sending, to the messaging application (optionally via the operating system), a command that causes the messaging application to reply to a most recent and/or currently rendered message with "sounds great".

In some implementations, determining whether to activate on-device NLU and/or on-device fulfillment can additionally and/or alternatively be based on processing the recognized text using an on-device semantic model to determine a probability of whether the recognized text is directed to an automated assistant. On-device NLU and/or on-device fulfillment are more likely to be activated when the probability is more indicative of the recognized text being directed to an automated assistant. The semantic model can be trained to differentiate between text that is directed to an automated assistant and text that is not directed to an automated assistant (e.g., instead is directed to another human and/or from a television or other source). The semantic model can be utilized to process the text on a token-by-token basis, or can optionally process an embedding of the recognized text, such as a generated Word2Vec embedding or other semantic embedding.

In some implementations, determining whether to activate on-device NLU and/or on-device fulfillment can additionally and/or alternatively be based on TI-SID (described above), directed speech (described above), and/or other consideration(s). For example, on-device NLU and/or on-device fulfillment can be more likely to be activated if directed speech is detected and/or is determined with a higher probability. Also, for example, on-device NLU and/or on-device fulfillment can be more likely to be activated if TI-SID indicates that the spoken utterance is from a currently active profile of the client device.

In some implementations, one or more of the considerations described above can be processed by a query classifier in determining whether to activate on-device NLU and/or on-device fulfillment. The query classifier can utilize one or more rules and/or a query model in determining whether to activate on-device NLU and/or on-device fulfillment. For example, rule(s) can dictate that if condition(s) are present, alone or in combination with other particular condition(s), then on-device NLU and/or on-device fulfillment should be activated. For instance, a rule can dictate that on-device NLU and on-device fulfillment should be activated if the recognized text matches a phrase in the assistant language model and matches currently rendered content. In implementations where a query model is utilized, it can be a machine learning model trained, for example, based on supervised and/or semi-supervised training examples. For example, the training examples can have training example inputs that are based on various determinations describe above, from actual interactions of participating users, with permission from those participating users. Further, the training examples can be labeled as "positive" (i.e., the spoken utterance was intended as an assistant request) responsive to corresponding users interacting with the resulting response and/or providing positive feedback to a prompt inquiring if the spoken utterance was intended as an assistant request. The supervised training examples can be labeled as "negative" (i.e., the spoken utterance was intended as an assistant request) responsive to corresponding users quickly dismissing the resulting response (e.g., before it is fully rendered and/or before it can be fully interpreted) and/or providing negative feedback to a prompt inquiring if the spoken utterance was intended as an assistant request.

It is noted that, in contrast to the supervision signal(s) or explicit labels utilized in training the attention model (described above), the supervision signals or explicit labels utilized in training the query model seek to ensure that the user is intending to interact with the automated assistant. Thus, while the attention model can be trained to purposefully result in some "over-triggering" of the on-device speech recognition, the query model is trained to mitigate false-positive occurrences of triggering on-device NLU and/or on device fulfillment. In these and other manners, through cooperative utilization of on-device speech recognition activation techniques and on-device NLU and/or fulfillment activation techniques disclosed herein, hot-word free spoken utterances are fully processed and acted upon when intended for the automated assistant, while instances of under-triggering are mitigated. This can mitigate occurrences of a user needing to again provide the spoken utterance, optionally preceded by an explicit invocation queue, which can prolong the user's interaction with the automated assistant and cause undue consumption of resources. In various implementations, on-device training of the query model can occur to personalize the attention model to the client device and/or to provide gradient(s) (from the training) for utilization in federated learning (e.g., to further train a query model based on gradients from multiple client devices, and provide the further trained model for utilization). When on-device training occurs, signal(s), such as but not limited to those described above, can be utilized as a supervision signal for the training.

When on-device NLU is activated, the on-device natural language understanding is performed on the recognized text to generate natural language understanding data. Further, when the on-device fulfillment is activated, an on-device fulfillment is determined using the natural language understanding data. As described herein, on-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

Some implementations disclosed herein include one or more computing devices that include one or more processors such as central processing unit(s) (CPU(s)), graphics processing unit(s) (GPU(s)), digital signal processor(s) (DSP(s)), and/or tensor processing unit(s) (TPU(s)). One or more of the processors are operable to execute instructions stored in associated memory, and the instructions are configured to cause performance of any of the methods described herein. The computing devices can include, for example, client assistant devices with microphone(s), at least one display, and/or other sensor component(s). Some implementations also include one or more non-transitory computer readable storage media storing computer instructions executable by one or more processors to perform any of the methods described herein.

DETAILED DESCRIPTION

Figure 1A:
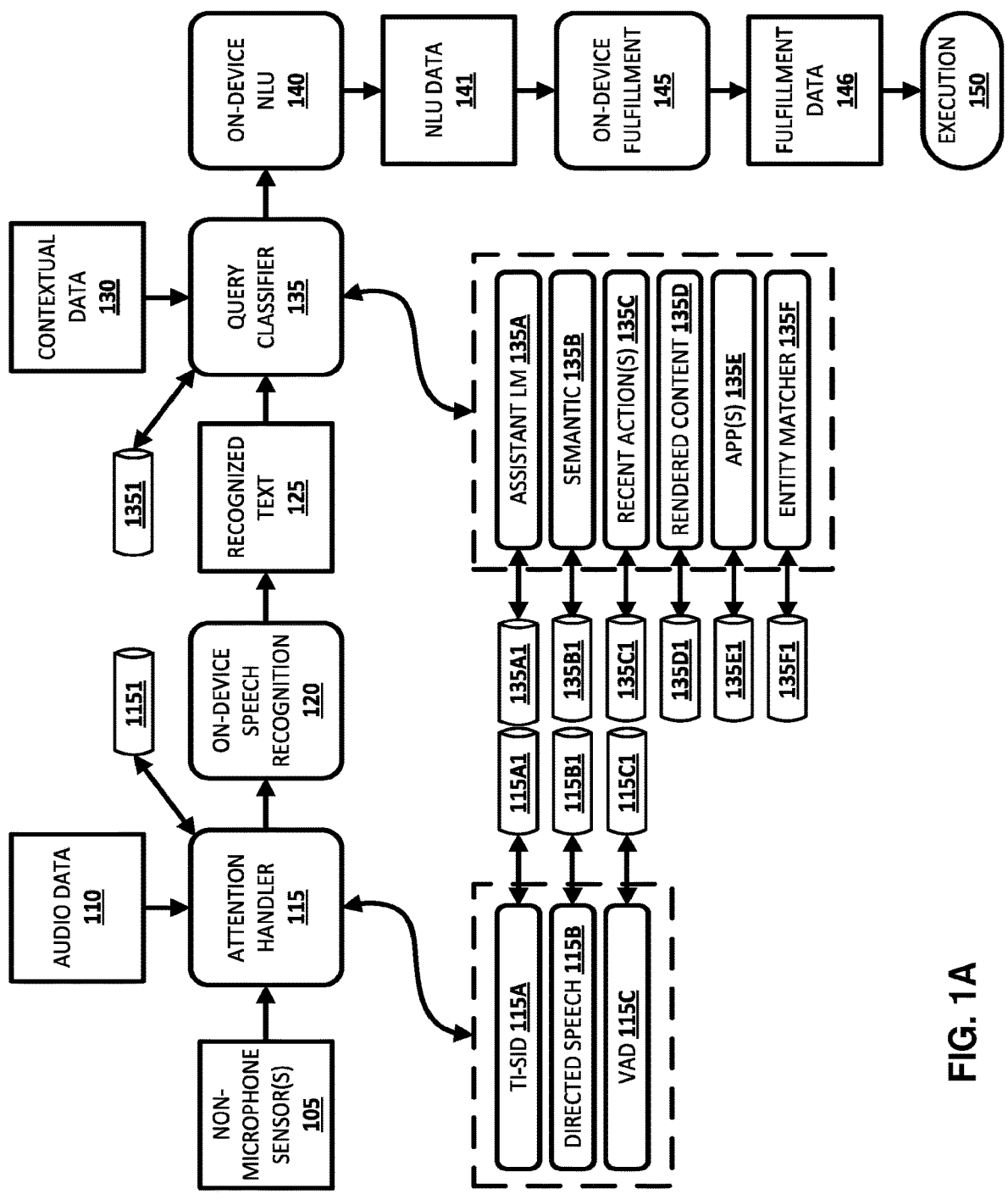
FIG. 1A depicts an example process flow that demonstrates various aspects of the present disclosure, in accordance with various implementations.
Figure 1B:
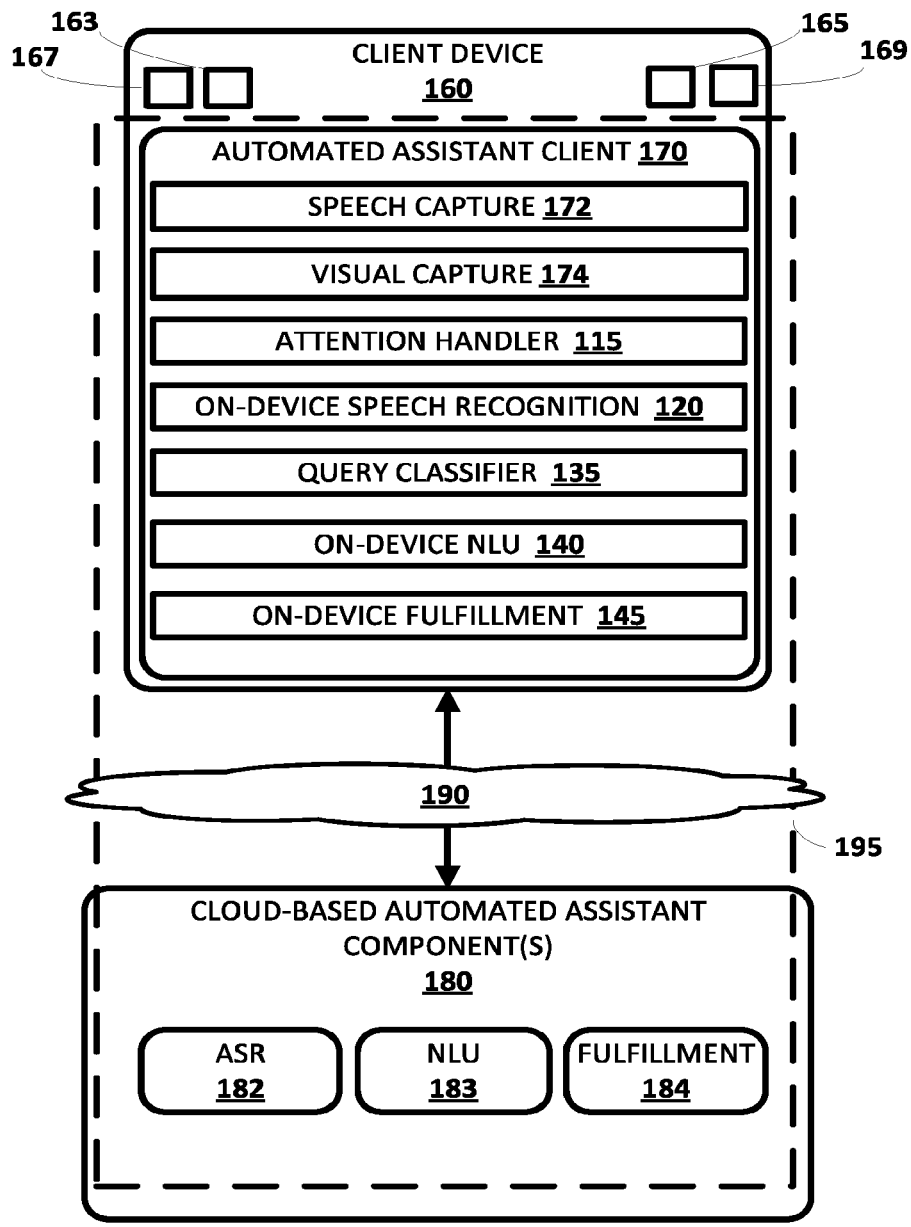
FIG. 1B is a block diagram of an example environment that includes various components from FIG. 1A, and in which implementations disclosed herein may be implemented.

Turning initially to FIG. 1A, an example process flow is illustrated that demonstrates various aspects of the present disclosure, in accordance with various implementations. The components illustrated in FIG. 1A can be implemented on client device 160 (FIG. 1B). In FIG. 1A, an attention handler 115 receives audio data 110 that is detected via one or microphones (165, FIG. 1B) of the client device 160 and/or sensor data from one or more non-microphone sensors 105 of the client device 160. As described herein, the audio data 110 received and/or utilized by the attention handler 115 can include the raw audio data, and/or a representation thereof. The audio data 110 can be provided in a streaming fashion as new audio data is detected. Moreover, the sensor data received from the non-microphone sensor(s) 105 can be raw sensor data and/or representation and/or abstraction thereof (e.g., abstraction provided by the operating system of the client device 160). The sensor data can likewise be provided in a streaming fashion as new sensor data is detected. The non-microphone sensor(s) 105 can include, for example, gyroscope(s), accelerometer(s), laser-based vision sensor(s), camera(s), and/or other sensor component(s) of the client device.

The attention handler 115 processes the audio data 110 and/or the sensor data from the non-microphone sensor(s) 105 to determine whether to activate on-device speech recognition engine 120. In addition to activating on-device speech recognition engine 120 responsive to detecting one or more explicit invocation cues, in various implementations the attention handler 115 can additionally or alternatively activate on-device speech recognition engine 120 in response to various implicit cues. This enables reduced user input to be provided by the user (at least due to omission of the hot-word or other explicit invocation cue), which directly lessens the duration of the interaction and thereby conserves various local processing resources that would otherwise be utilized in a prolonged interaction.

The attention handler 115 processes various metric(s) (e.g., from audio data 110) and/or sensor data (e.g., representations or abstractions thereof) in determining whether to activate on-device speech recognition engine 120. The attention handler 115 can utilize one or more rules and/or an attention model 115I in determining whether to activate the on-device speech recognition engine 120. The attention model 115I can be a machine learning model trained, for example, based on supervised and/or semi-supervised training examples.

In some implementations attention handler 115 includes a TI-SID module 115A, a directed speech module 115B, and/or a voice-activity detection (VAD) module 115C that are each utilized to process audio data and provide one or more metrics to attention handler 115. Attention handler 115 utilizes the provided metric(s) in determining whether to activate on-device speech recognition 120.

The TI-SID module 115A processes audio data 110 using a TI-SID model 115A1 to generate an embedding for all or portions of a spoken utterance captured by the audio data. The TI-SID model 115A1 can be, for example, a recurrent neural network model and/or other model trained for utilization in processing a sequence of audio data for generating a rich embedding for the audio data for text-independent speech. A TI-SID model is in contrast to text-dependent speaker identification models that can only be utilized for a very restricted set of words (e.g., hot-words).

The TI-SID module 115A compares the generated embedding to locally stored embedding(s) for one or more user accounts/profiles registered with the client device 160 (e.g., an embedding for the sole and/or primary user registered with the client device 160). The TI-SID module 115A can then be generated based on the comparison, where the TI-SID metric indicates whether the generated embedding matches one of the stored embedding(s) and/or a degree to which they match. In some implementations or situations, the attention handler 115 can optionally activate the on-device speech recognition engine 120 only when the TI-SID metric indicates a match (i.e., a distance between the embeddings that satisfies a threshold). For example, the attention handler 115 can always require the TI-SID metric indicate a match to activate the on-device speech recognition engine 120. As another example, the attention handler 115 can require the TI-SID metric indicate a match to activate the on-device speech recognition engine 120, when it is the sole metric relied upon and/or is relied upon only in combination with one or more implicit invocation cue(s) (i.e., when no explicit cue(s) are detected).

Directed speech module 115B can utilize a trained acoustic model 115B1 that is trained to differentiate between spoken utterances that are directed to a client device and spoken utterances that are not directed to a client device. Instead of differentiating between human speech and no human speech, directed speech processing module 115B seeks to differentiate between human speech that is directed to a client device and human speech that is not directed to a client device (e.g., human speech directed to another human, human speech emanating from a television or other source). Directed speech processing module 115B, by processing the audio data 110 using the acoustic model 115B1, can generate a directed speech metric that indicates whether human speech is detected that is directed to a client device and can be a binary metric, or a probability. In some implementations or situations, the attention handler 115 can optionally activate the on-device speech recognition engine 120 only when the directed speech module 115B indicates directed speech (e.g., a directed speech metric that satisfies a threshold). For example, the attention handler 115 can always require the directed speech module 115B indicate directed speech to activate the on-device speech recognition engine 120. As another example, the attention handler 115 can require the directed speech module 115B indicate directed speech to activate the on-device speech recognition engine 120, when it is the sole metric relied upon and/or is relied upon only in combination with one or more implicit invocation cue(s) (i.e., when no explicit cue(s) are detected).

The VAD module 115C processes audio data 110 to monitor for the occurrence of any human speech, and can output a voice activity metric that indicates whether voice activity is present. The voice activity metric can be a binary metric, or a probability of there being human speech in the audio data. The VAD module 115C can optionally utilize a VAD model 115B1 in processing audio data and determining whether voice activity is present. The VAD model 115B1 can be a machine learning model trained to enable discrimination between audio data without any human utterances and audio data with human utterance(s). In some implementations or situations, the attention handler 115 can optionally activate the on-device speech recognition engine 120 only when the VAD module 115C indicates voice activity. For example, the attention handler 115 can always require the VAD module 115C indicate a match to activate the on-device speech recognition engine 120. As another example, the attention handler 115 can require the VAD module 115C indicate a match to activate the on-device speech recognition engine 120, when it is the sole metric relied upon and/or is relied upon only in combination with one or more implicit invocation cue(s) (i.e., when no explicit cue(s) are detected). In some implementations, TI-SID module 115A and/or directed speech module 115B can optionally be activated only once VAD module 115C detects voice activity, though they can optionally process buffered audio data once activated.

In some implementations or situations, attention handler 115 can activate on-device speech recognition engine 120 based on processing of audio data 110 alone. However, in other implementations or situations, attention handler 115 can activate on-device speech recognition engine 120 additionally or alternatively based on processing of sensor data from non-microphone sensor(s) 105. Raw sensor data itself can be processed, or abstractions or other representations of the raw sensor data, such as abstractions provided by the operating system of the client device. For example, representation(s) of sensor data from accelerometer(s), gyroscope(s), camera(s), and/or laser-based vision sensor(s) can be utilized. Also, for example, and/or an indication from the operating system and/or another component, that is based on raw sensor data, can be utilized and can indicate whether the client device has been picked up, is currently being held, is in the user's pocket, and/or in another state. The attention handler 115 can optionally prevent the on-device speech recognition engine 120 from being activated in response to certain sensor data (e.g., an abstraction that indicates the client device 160 is in the user's pocket or other stowed position) and/or can require certain senor data before activating the on-device speech recognition engine 120.

As described herein, the attention handler 115 can optionally utilize the attention model 1151 (alone or in combination with one or more rules) in determining whether to activate the on-device speech recognition engine 120. The attention model 1151 can be a machine learning model trained, for example, based on supervised and/or semi-supervised training examples. For example, semi-supervised training examples can have training example inputs that are based on audio data and/or additional sensor data from actual interactions of participating users, with permission from those participating users. Further, the semi-supervised training examples can be labeled as "positive" or "negative" based on directed gaze detection and/or other semi-supervised (or even supervised) techniques. As also described herein, the labeling can ensure sufficient activation of the on-device speech recognition engine 120 to ensure spoken utterances are recognized, and with the recognition that additional technique(s) described herein will prevent on-device NLU and/or on-device fulfillment in situation(s) in which interaction with the automated assistant is not intended.

Once attention handler 115 activates on-device speech recognition engine 120, the on-device speech recognition engine 120 processes audio data 110 using an on-device speech recognition model (not illustrated in FIG. 1A for simplicity) to determine recognized text 125 in a spoken utterance (if any) captured by the audio data 110. The on-device speech recognition model can optionally be an end-to-end model, and can optionally be supplemented by one or more techniques that seek to generate additional recognized text hypotheses, and choose the best hypothesis using various considerations. The audio data 110 processed can include audio data captured after the on-device speech recognition is activated, and optionally locally buffered recent audio data (e.g., at least some of that processed by attention handler 115 prior to activation of the on-device speech recognition engine 120). In some implementations, when on-device speech recognition engine 120 is activated, human perceptible cue(s) are rendered to inform the user that such activation has occurred and/or to render a stream of the recognized text 125 as the recognition is occurring. The visual rendering can also include a selectable "cancellation" element that, when selected via touch input at the touch-screen display, halts the on-device speech recognition engine 120. Activating speech recognition engine 120 or other component, as used herein, means at least causing it to perform processing beyond what it was previously performing prior to activation. It can mean activating it from a fully dormant state.

The query classifier 135 determines, based on the recognized text 125 and optionally contextual data 130, whether to activate on-device NLU engine 140 and/or on-device fulfillment engine 145 (and/or to cause a resulting execution 150 based on output from the fulfillment engine 145). The query classifier 135 can activate on-device NLU engine 140 and/or on-device fulfillment engine 145 only responsive to determining, using one or more techniques described herein, that such further processing should occur. In many implementations, processing performed by the query classifier 135 is more computationally efficient than processing that occurs by on-device NLU engine 140, on-device fulfillment engine 145, and/or execution of any generated fulfillment. Through such selective activation of on-device speech processing, and/or the further selective activation of on-device NLU and/or on-device fulfillment, various resources of client device 160 are conserved and/or security of user data is maintained.

In some implementations query classifier 135 includes an assistant language model (LM) module 135A, a semantic module 135B, a recent action(s) module 135C, a rendered content module 135D, an app(s) module 135E, and/or an entity matcher 135F. Each of the modules utilize the recognized text 125, and optionally contextual data 130 and/or an associated model, to provide one or more metrics to query classifier 135. The query classifier 135 utilizes the provided metric(s) in determining whether to activate on-device NLU engine 140 and/or on-device fulfillment engine 145.

Assistant language model (LM) module 135A can determine whether the recognized text (all or portion(s) thereof) matches one or more phrases in a locally stored assistant LM module 135A1. Query classifier 135 is more likely to activate on-device NLU engine 140 and/or on-device fulfillment engine 145 when the recognized text matches phrase(s) stored in the locally stored assistant LM module 135A1. The locally stored assistant LM module 135A1 can include a plurality of phrases that are each interpretable and actionable by an automated assistant, and can exclude any phrases that are not interpretable and actionable by an automated assistant. Optionally, in view of storage constraints of client devices, the assistant LM module 135A1 can be restricted to a certain quantity of phrases, and the included phrases can be selected for inclusion based on consideration(s), such as frequency of use (e.g., globally, at the client device 160, and/or by a user of the client device 160 optionally across multiple client devices).

Semantic module 135B processes the recognized text 125 using semantic model 135B1 to determine a probability that the recognized text is directed to an automated assistant. The semantic model 135B1 can be trained to differentiate between text that is directed to an automated assistant and text that is not directed to an automated assistant (e.g., instead is directed to another human and/or from a television or other source). The semantic model 135B1 can be utilized to process the text on a token-by-token basis (e.g., it can be a recurrent neural network model), or can optionally process an embedding of the recognized text, such as a generated Word2Vec embedding or other semantic embedding. Query classifier 135 is more likely to activate on-device NLU engine 140 and/or on-device fulfillment engine 145 when the recognized text is indicated by the semantic module 135B to be directed to an automated assistant.

Recent action(s) module 135C can determine, optionally with reference to related action(s) model 135C1, one or more related action phrases based on the one or more related action phrases each having a defined correspondence to a recent action. The recent action is one performed, at and/or via the client device 160, responsive to prior user input (i.e., that precedes the current spoken utterance). For example, the recent action(s) module 135C can determine the recent action from contextual data 130. Further, the recent action(s) module 135C can determine related action(s) using related action(s) model 135C1, which can include mappings between each of a plurality of actions, and related action phrase(s) that are related to each of the action(s). The recent action(s) module 135C can further determine whether at least part of the recognized text 125 matches at least one of the one or more related action phrases. Query classifier 135 is more likely to activate on-device NLU engine 140 and/or on-device fulfillment engine 145 when the recognized text 125 matches the related action phrase(s).

Rendered content module 135D can determine, optionally with reference to rendered content model 135D1, whether at least part of the recognized text 125 conforms to content being rendered at the client device 160 during the spoken utterance. Content being rendered at the client device can be determined from contextual data 130, and can optionally be supplemented with "related" content using rendered content model 135D1. For example, if a suggested automated assistant action of "show me weather for [city]" is being visually displayed during the spoken utterance, recognized text that includes "show me weather" and/or a name of a city can be determined to conform to the visually rendered content. Names of cities (indicated by the placeholder [city] in the suggestion) can be determined with reference to rendered content model 135D1. As another example, content that is being audibly rendered at the client device 160 can also be considered by rendered content module 135D. Query classifier 135 is more likely to activate on-device NLU engine 140 and/or on-device fulfillment engine 145 when the recognized text 125 conforms to content being rendered.

App(s) module 135E determines whether at least part of the recognized text 125 conforms to a non-automated assistant application that is executing during the spoken utterance. For example, if a lighting control application is executing in the foreground, recognized text that includes "turn on", "adjust", "light" and/or other text related to the lighting control application can be considered to conform to action(s) performable by the non-automated assistant application. Optionally, a foreground application and/or recently foreground application(s) can be actively solicited, to determine action(s) and/or text that are relevant to the respective current state(s) of the applications, and/or the application(s) overall. Such solicitation can optionally occur via the operating system of the client device 160. Query classifier 135 is more likely to activate on-device NLU engine 140 and/or on-device fulfillment engine 145 when the recognized text 125 conforms to an application on the client device 160, such as an application executing in the foreground and/or recently executing in the foreground.

Entity matcher 135F can determine if recognized text 125 conforms to an entity being rendered by client device 160 and/or a locally stored entity that is locally stored based on being determined to be of interest to a user of the client device 160. The entity matcher 135F can utilize entity database 135F1, which can include a subset of global entities that are locally stored responsive to being determined to be relevant based on past interaction(s) (assistant or otherwise) at the client device 160, a geographic location of the client device 160, and/or other considerations. Entity matcher 135F can determine recognized text 125 conforms to any of such entities if it matches, for example, an alias of an entity, an attribute of the entity, and/or attribute of an additional entity that is related (i.e., with at least a threshold degree of relatedness) to the entity, can be determined to conform to the visually rendered content. For example, if a particular sports team is stored in the entity database 135F1, recognized text that includes an alias of the sports team can be determined to conform to the entity. Query classifier 135 is more likely to activate on-device NLU engine 140 and/or on-device fulfillment engine 145 when the recognized text 125 conforms to an entity being rendered and/or that is in entity database 135F1.

In some implementations, one or more of the considerations described above can be processed by query classifier 135 in determining whether to activate on-device NLU and/or on-device fulfillment. The query classifier 135 can utilize one or more rules and/or a query model 135B1 in determining whether to activate on-device NLU and/or on-device fulfillment. For example, rule(s) can dictate that if condition(s) are present, alone or in combination with other particular condition(s), then on-device NLU and/or on-device fulfillment should (or should not) be activated. For instance, a rule can dictate that on-device NLU and on-device fulfillment should be activated only when the recognized text matches a phrase in the assistant language model or matches currently rendered content. In implementations where query model 135B1 is utilized, it can be a machine learning model trained, for example, based on supervised and/or semi-supervised training examples. For example, the training examples can have training example inputs that are based on actual interactions of participating users, with permission from those participating users. It is noted that, in contrast to the supervision signal(s) or explicit labels utilized in training the attention model (described above), the supervision signals or explicit labels utilized in training the query model seek to ensure that the user is intending to interact with the automated assistant.

When on-device NLU engine 140 is activated, the on-device NLU engine 140 performs on-device natural language understanding on the recognized text 125 to generate NLU data 141. NLU engine 140 can optionally utilize one or more on-device NLU models (not illustrated in FIG. 1A for simplicity) in generating the NLU data 141. NLU data 141 can include, for example, intent(s) that correspond to the spoken utterance and optionally parameter(s) (e.g., slot values) for the intent(s).

Further, when the on-device fulfillment engine 145 is activated, on-device fulfillment engine 145 generates fulfillment data 146 using the natural language understanding data. Fulfillment engine 145 can optionally utilize one or more on-device fulfillment models (not illustrated in FIG. 1A for simplicity) in generating the fulfillment data 146. This fulfillment data 146 can define local and/or remote responses (e.g., answers) to the spoken utterance, interaction (s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data 146 is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

Turning now to FIG. 1B, a block diagram is illustrated of an example environment that includes various components from FIG. 1A, and in which implementations disclosed herein may be implemented. The client device 160 at least selectively executes an automated assistant client 170. The term "assistant device" is also used herein to reference a client device 160 that at least selectively executes an automated assistant client 170. The automated assistant client 170 includes, in the example of FIG. 1B, the attention handler 115, the on-device speech recognition engine 120, the query classifier 135, the on-device NLU engine 140, and the on-device fulfillment engine 145 described above with respect to FIG. 1A. The automated assistant client 170 further includes speech capture engine 172 and visual capture engine 174, described in more detail below.

One or more cloud-based automated assistant components 180 can optionally be implemented on one or more computing systems (collectively referred to as a "cloud" computing system) that are communicatively coupled to client device 160 via one or more local and/or wide area networks (e.g., the Internet) indicated generally at 190. The cloud-based automated assistant components 180 can be implemented, for example, via a cluster of high-performance servers.

In various implementations, an instance of an automated assistant client 170, by way of its interactions with one or more cloud-based automated assistant components 180, may form what appears to be, from a user's perspective, a logical instance of an automated assistant 195 with which the user may engage in a human-to-computer interactions (e.g., spoken interactions, gesture-based interactions, and/or touch-based interactions).

The one or more client devices 160 can include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided.

Client device 160 can optionally be equipped with one or more vision components 163 having one or more fields of view. Vision component(s) 163 can take various forms, such as monographic cameras, stereographic cameras, a LIDAR component (or other laser-based component(s)), a radar component, etc. The one or more vision components 163 may be used, e.g., by visual capture engine 174, to capture vision frames (e.g., image frames, laser-based vision frames) of an environment in which client device 160 is deployed. In some implementations, such vision frame(s) can be utilized to determine whether a user is present near the client device 160 and/or a distance of the user (e.g., the user's face) relative to the client device. Such determination(s) can be utilized by attention handler 115 in determining whether to activate on-device speech recognition engine 120, and/or by query classifier 135 in determining whether to activate on-device NLU engine 140 and/or on-device fulfillment engine 145.

Client device 160 can also be equipped with one or more microphones 165. Speech capture engine 172 can be configured to capture user's speech and/or other audio data captured via microphone(s) 165. As described herein, such audio data can be utilized by attention handler 115 and/or on-device speech recognition engine 120.

Client device 160 can also include one or more presence sensors 167 and/or one or more displays 169 (e.g., a touch-sensitive display). Display(s) 169 can be utilized to render streaming text transcriptions from the on-device speech recognition engine 120 and/or can be utilized to render assistant responses generated in executing some fulfillments from on-device fulfillment engine 145. Display(s) 103 can further be one of the user interface output component(s) through which visual portion(s) of a response, from automated assistant client 110, is rendered. Presence sensor(s) 167 can include, for example, a PIR and/or other passive presence sensor(s). In various implementations, one or more component(s) and/or function(s) of the automated assistant client 170 can be initiated responsive to a detection of human presence based on output from presence sensor(s) 167. For example, attention handler 115, visual capture engine 174, and/or speech capture engine 172 can optionally be activated only responsive to a detection of human presence. Also, for example, those and/or other component(s) (e.g., on-device speech recognition engine 120, on-device NLU engine 140, and/or on-device fulfillment engine 145) can optionally be deactivated responsive to no longer detecting human presence. In implementations where initiating component(s) and/or function(s) of the automated assistant client 170 is contingent on first detecting presence of one or more users, power resources can be conserved.

In some implementations, cloud-based automated assistant component(s) 180 can include a remote ASR engine 182 that performs speech recognition, a remote NLU engine 183 that performs natural language understanding, and/or a remote fulfillment engine 184 that generates fulfillment. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 180 can be utilized at least selectively. For example, such component(s) can be utilized in parallel with on-device component(s) and output from such component(s) utilized when local component(s) fail. For example, on-device fulfillment engine 145 can fail in certain situations (e.g., due to relatively limited resources of client device 160) and remote fulfillment engine 184 can utilize the more robust resources of the cloud to generate fulfillment data in such situations.

Remote fulfillment engine 184 can be operated in parallel with on-device fulfillment engine 145 and its results utilized when on-device fulfillment fails, or can be invoked responsive to determining failure of on-device fulfillment.

In various implementations, an NLU engine (on-device and/or remote) can generate annotated output that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with automated assistant 195. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 160. Another grammar, "[weather| forecast] today," may be match-able to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping>pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local and/or remote) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In some implementations, on-device fulfillment engine 145 can utilize various local data in determining the fulfillment information, such as local pre-cached fulfilments for various intents, locally obtained information from local installed applications, and/or other local data. For example, the on-device fulfillment engine 145 (or other component) can maintain a local cache that includes mappings between various intents (and optionally slot value(s)) and associated fulfillment data. At least some of the local cache can be populated with fulfillment data based on that fulfillment data having been previously provided to the assistant application, from the cloud-based automated assistant component(s) 180, responsive to a prior request at the client device 160 that was unable to be locally fulfilled by on-device fulfillment engine 145. The fulfillment data can be mapped to intent(s) (and optionally slot value(s)) of the request, and/or to the recognized text on which the intent(s) (and optionally slot value(s)) were generated. For example, the prior request can be "what is the default IP address for Hypothetical router" and the response (textual and/or audible) of "192.168.1.1" may have previously been retrieved from the cloud-based automated assistant component(s) 180 responsive to being unable to be locally fulfilled by on-device fulfillment engine 145. The response could then be cached locally, optionally responsive to an indication in the response that it is static, and mapped to the recognized text of the prior response and/or corresponding NLU data. Thereafter, and while the response is still locally cached, a subsequent request of "what is the default IP address for Hypothetical router" can be fulfilled locally through utilization of the cache (i.e., through utilization of the cached response of "192.168.1.1"). As another example, some fulfillment data and mapped NLU data (and/or corresponding query) can be proactively pushed to the automated assistant client 170, despite the response having not been previously rendered by the automated assistant client 170 and/or corresponding query having not been previously submitted at the automated assistant client 170. For example, today's weather forecast and/or tomorrow's weather forecast can be proactively pushed, along with mappings to corresponding intent(s) (e.g., "weather request") and slot value(s) (e.g., "today", "tomorrow", respectively) despite those forecasts having not been previously rendered at the automated assistant client 170 (although prior day's forecasts may have been rendered responsive to related requests). While the responses are still locally cached, a request of "what is today's weather" or "what is tomorrow's weather" can be fulfilled locally through utilization of the cache.

Figure 2:
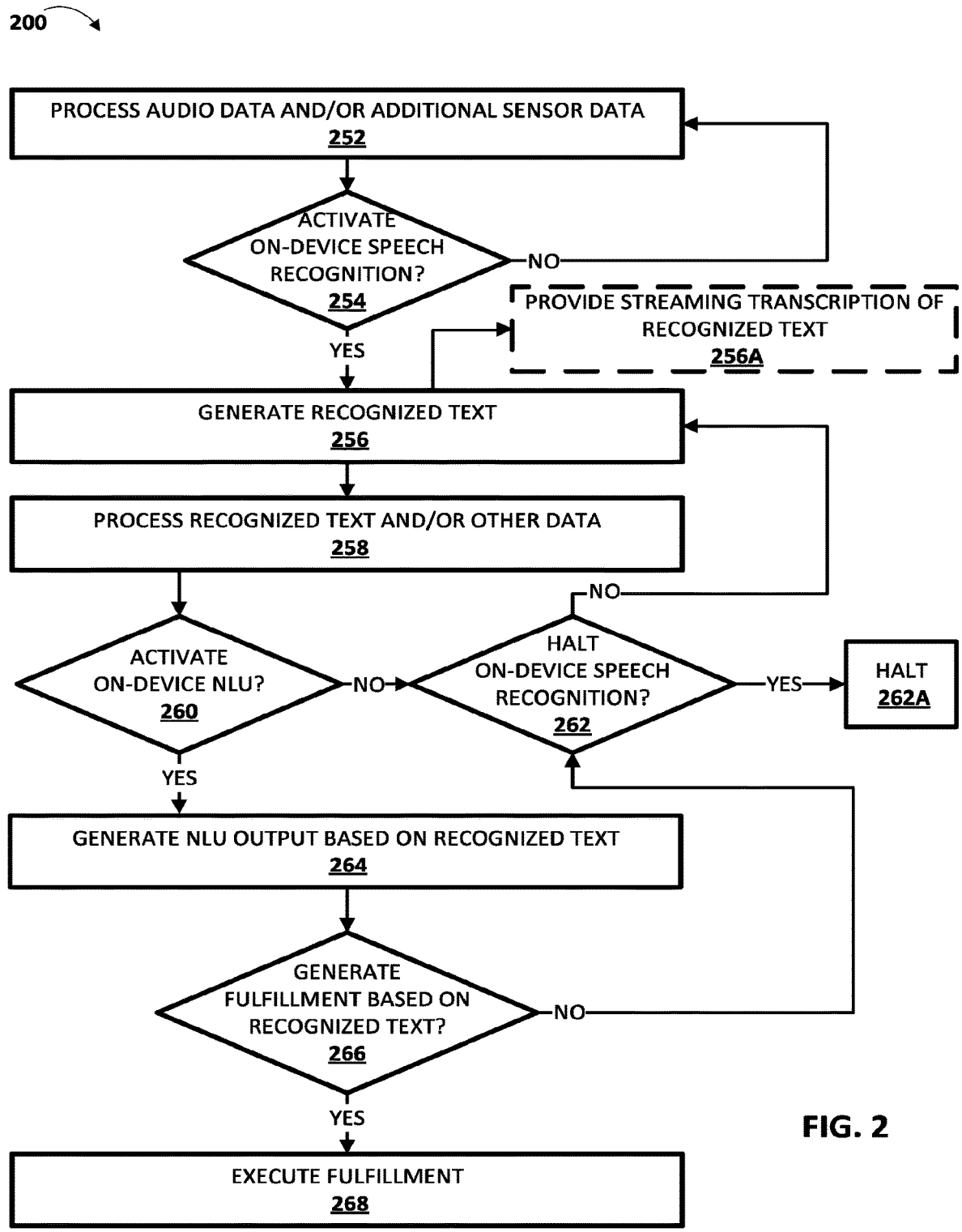
FIG. 2 depicts a flowchart illustrating an example method according to implementations disclosed herein.

FIG. 2 depicts a flowchart illustrating an example method 200 according to implementations disclosed herein. For convenience, the operations of the method 200 are described with reference to a system that performs the operations. This system may include various components of various computer systems, such as one or more components of a client device (e.g., the client device 160 of FIG. 1). Moreover, while operations of the method 200 are shown in a particular order, this is not meant to be limiting. One or more operations may be reordered, omitted or added. As will be appreciated, the operations illustrated in FIG. 2 may correspond with various operations described herein (e.g., operations described in the Summary, and FIGS. 1A, 1B, 3A, 3B, 4A, 4B, 5A, and 5B).

At block 252, the system processes audio data and/or additional sensor data. The audio data is detected by one or more microphones of a client device. The additional sensor data can be from one or more non-microphone sensor(s) of the client device. As described herein, processing audio data and/or additional sensor data can include processing raw audio data and/or raw additional sensor data, and/or representation(s) and/or abstraction(s) thereof.

At block 254, the system determines, based on the processing of block 252, whether to activate on-device speech recognition. If the decision at block 254 is no, the system continues to process audio data and/or additional sensor data at block 252.

If the decision at block 254 is yes, the system proceeds to block 256 and generates recognized text using the now activated on-device speech recognition. The recognized text can be generated based on buffered audio data (e.g., buffered during the processing of block 252) and/or subsequently received audio data. Optionally, at block 256A the system also provides, via a display of the client device, a streaming transcription of the recognized text, as it is being recognized by the activated on-device speech recognition.

At block 258, the system processes the recognized text (generated at block 256) and/or other data. In some implementations, block 258 can begin in response to detecting an end of a spoken utterance utilizing endpointing and/or other techniques. In some other implementations, block 258 can begin as recognized text is generated or otherwise before endpointing, to reduce latency.

At block 260, the system determines, optionally based on the processing of block 258, whether to activate on-device NLU.

If the decision of block 260 is no, the system proceeds to block 262 and determines whether to halt on-device speech recognition. In some implementations, determining whether to halt on-device speech recognition can include determining whether a threshold amount of time has passed without detecting voice activity, directed speech, any recognized text, and/or other consideration(s).

If the decision of block 262 is yes, the system proceeds to block 262A and halts on-device speech recognition, and then proceeds back to block 252.

If the decision of block 262 is no, the system proceeds to block 256 and continues to recognize text, using on-device speech recognition, for any spoken utterance in new audio data.

If the decision of block 260 is yes, the system proceeds to block 264 and generates NLU output, using on-device NLU and based on the recognized text.

At block 266, the system determines whether to generate fulfillment data, using an on-device fulfillment engine. In some implementations, the system determines to generate fulfillment data if the system generates NLU output at block 264. In some implementations, the system determines to generate fulfillment data based on the processing of block 258. As described herein, in some implementations block 266 can further include, determining to utilize remote fulfillment data from a remote fulfillment engine if on-device fulfillment is unsuccessful. NLU data and/or recognized text can be provided to the remote fulfillment engine to obtain the remote fulfillment data. Provision of such data can occur responsive to determining on-device fulfillment is unsuccessful, or can occur preemptively to reduce latency in receiving the remote fulfillment data if the on-device fulfillment is unsuccessful.

If the decision at block 266 is no, the system proceeds to block 262. If the decision at block 266 is yes, the system proceeds to block 268 and executes a fulfillment that is in accordance with the fulfillment data generated at block 266. The execution of the fulfillment can occur on-device and/or remotely.

Figure 3A:
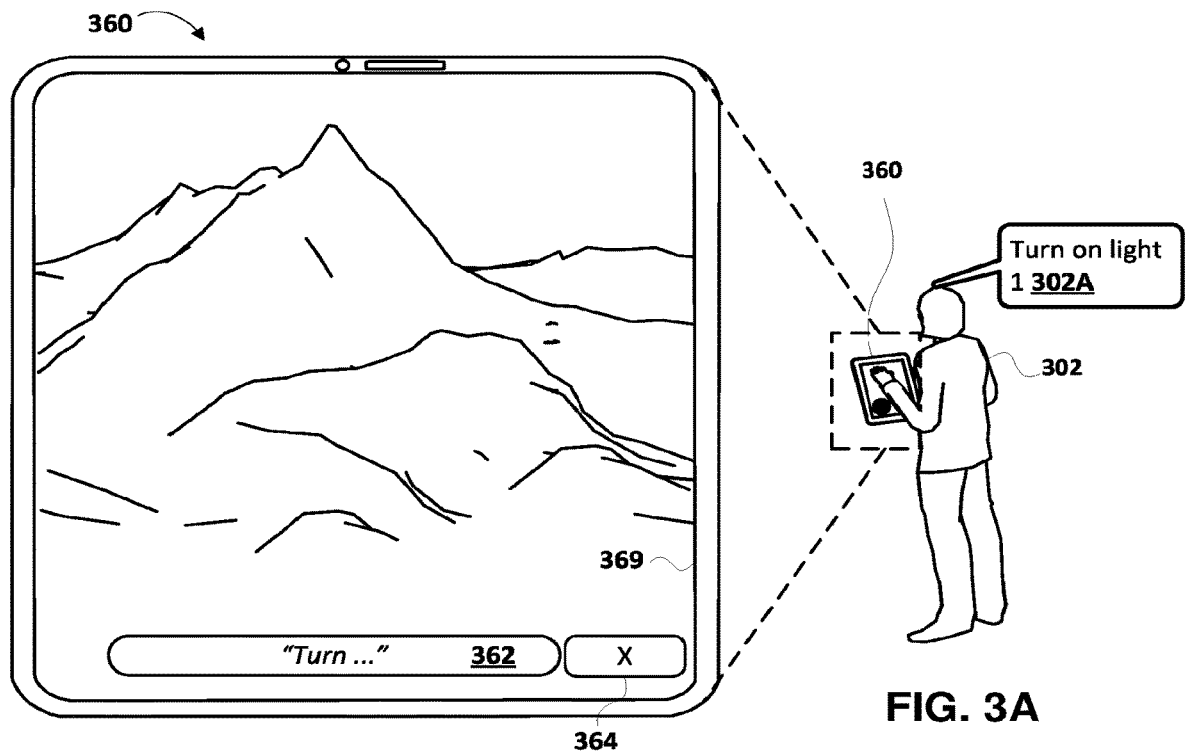
FIG. 3A depicts an example of client device, a user providing a hot-word free spoken utterance, and activated on-device speech recognition causing a streaming transcription of the spoken utterance to be rendered on a display of the client device.

FIG. 3A depicts an example of client device 360, a user 302 providing a hot-word free spoken utterance 302A of "Turn on light 1", and activated on-device speech recognition causing a streaming transcription 362 of the spoken utterance 302A to be rendered on a display 369 of the client device 360. A cancel button 364 is also illustrated that, when selected, causes cancellation of the on-device speech recognition, and prevents on-device NLU and on-device fulfillment from occurring for the spoken utterance. It is noted that the streaming transcription 362 and the optional cancel button 364 take up very little (i.e., less than 5%) of real estate on the display 369, so as to minimally occlude much currently rendered content and mitigate risk of distracting (and potentially prolonging) any current touch interactions of the user with the client device 360. The streaming transcription 362 and the optional cancel button 364 can optionally be overlaid atop any currently rendered content and can optionally be semi-transparently rendered. Further, at least the streaming transcription 362 can optionally include only the text without any background element(s). Such optional features can further mitigate the risk of distracting (and potentially prolonging) any current touch interactions of the user with the client device 360.

As described herein, various considerations can be considered in determining to activate the on-device speech recognition. For example, the on-device speech recognition can be activated based on non-microphone sensor signal(s) indicating that the user 302 is holding the client device 360 and/or has picked up the client device 360. Also, for example, the on-device speech recognition can additionally or alternatively be activated based on audio data (from microphones of the client device 360) indicating presence of voice activity, directed speech, and/or speech recognized as belonging to a profile of the user 302.

Figure 3B:
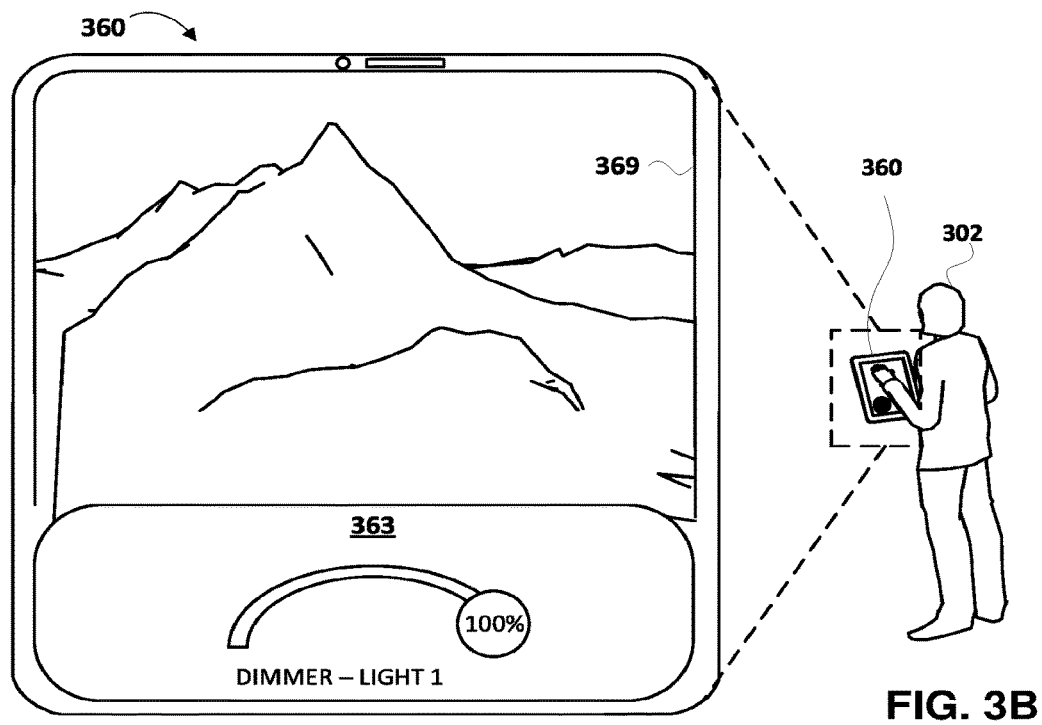
FIG. 3B depicts an example of the client device after the spoken utterance of FIG. 3A has been provided, and after on-device NLU and on-device fulfillment have been activated, and a corresponding execution of the fulfillment performed.

FIG. 3B depicts an example of the client device 360 after the spoken utterance 302A of FIG. 3A has been provided, and after on-device NLU and on-device fulfillment have been activated, and a corresponding execution of the fulfillment performed. For example, on-device NLU and/or on-device fulfillment can be activated in response to various considerations based on the recognized text and/or contextual data, as described herein. Further, the on-device NLU can be utilized to process the recognized text and generate NLU data, and the on-device fulfillment can be utilized to generate fulfillment data based on the NLU data. In the example of FIGS. 3A and 3B, the fulfillment data defines that command(s) should be sent (directly or indirectly) to "light 1" to cause it to turn on, and that a graphical interface 363 should be rendered. Execution of the fulfillment can be by on-device component(s), and/or by remote component(s). The graphical interface 363 both informs the user that "light 1" has been turned on, and provides the user 302 the ability to touch-interact with a dimmer element to adjust the brightness of "light 1". It is noted that the graphical interface 363 takes up relatively little (i.e., less than 25%) of real estate on the display 369, so as to minimally occlude currently rendered content and mitigate risk of distracting (and potentially prolonging) any current touch interactions of the user with the client device 360. The graphical interface 363 can optionally be overlaid atop any currently rendered content and can optionally be semi-transparently rendered.

Figure 4A:
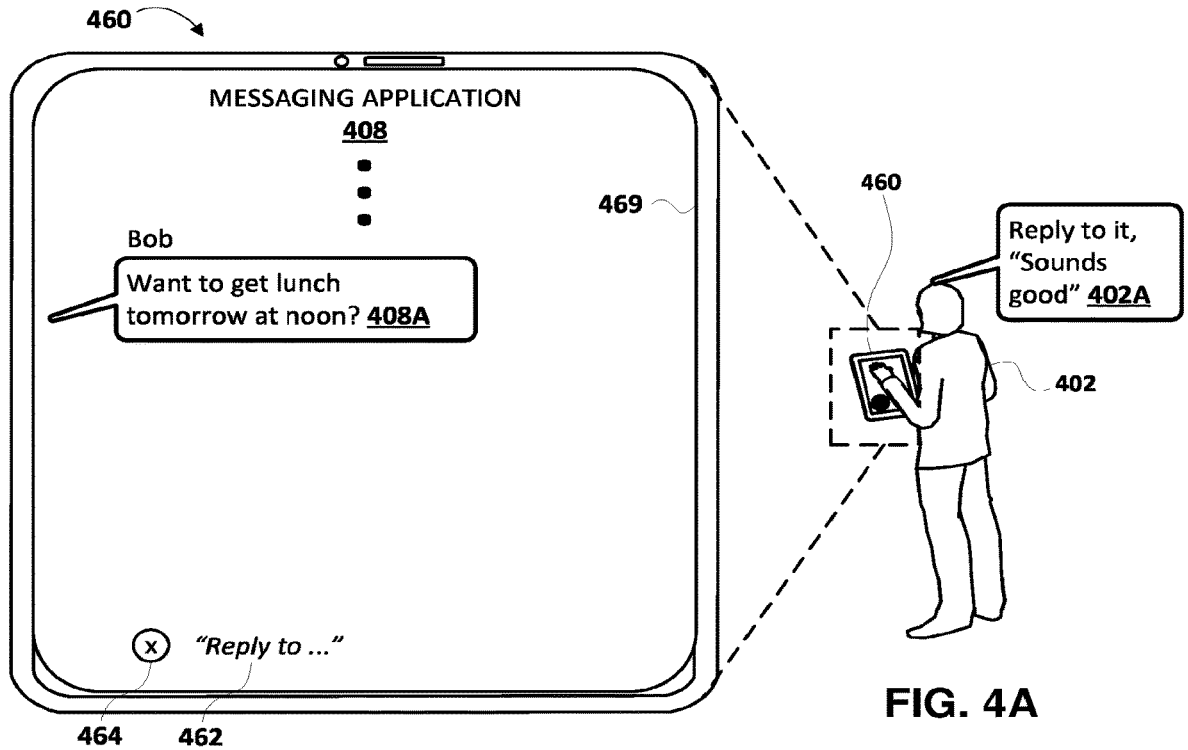
FIG. 4A depicts an example of a client device with a messaging application in the foreground, a user providing a hot-word free spoken utterance, and activated on-device speech recognition causing a streaming transcription of the spoken utterance to be rendered on a display of the client device.

FIG. 4A depicts an example of a client device 460 with a messaging application 408 in the foreground, a user 402 providing a hot-word free spoken utterance 402A of "Reply to it, 'Sounds good'", and activated on-device speech recognition causing a streaming transcription 462 of the spoken utterance 462A to be rendered on a display of the client device 460. A cancel button 464 is also illustrated that, when selected, causes cancellation of the on-device speech recognition, and prevents on-device NLU and on-device fulfillment from occurring for the spoken utterance. It is noted that the streaming transcription 462 and the optional cancel button 464 take up very little (i.e., less than 3%) of real estate on the display 469, so as to minimally occlude much currently rendered content and mitigate risk of distracting (and potentially prolonging) any current interactions of the user with the messaging application 408 (e.g., reading the message 408A from "Bob") rendered in the foreground of the client device 460. It is further noted that the streaming transcription 462 and the cancel button 464 are rendered by an assistant application that is separate from the messaging application 408. As described herein, various considerations can be considered in determining to activate the on-device speech recognition.

Figure 4B:
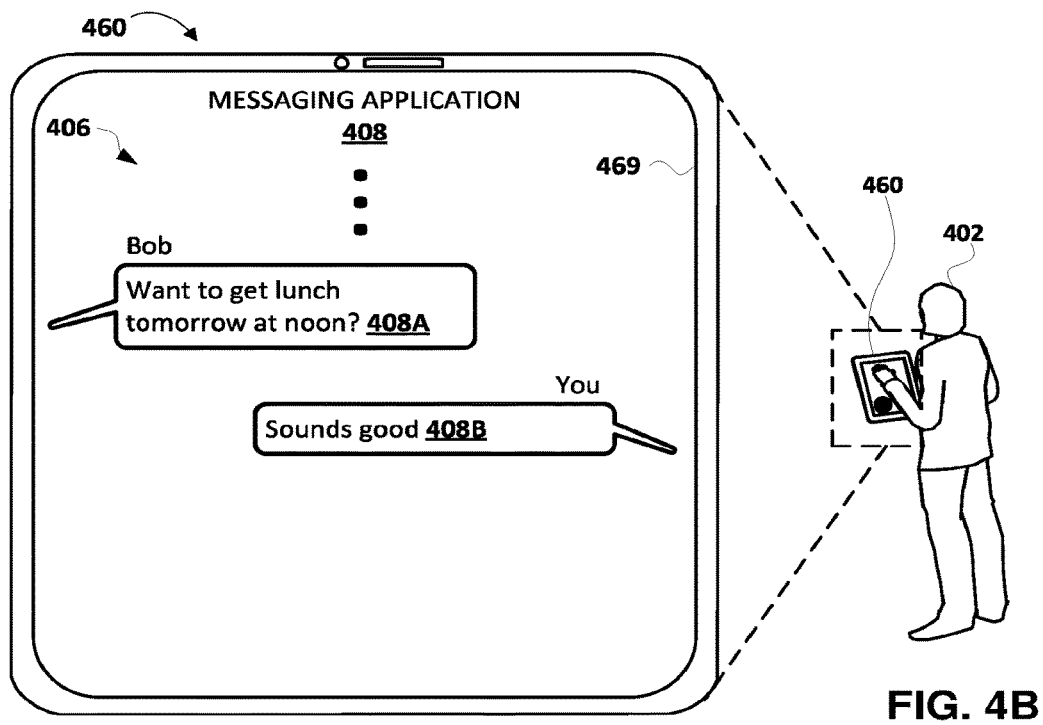
FIG. 4B depicts an example of the client device after the spoken utterance of FIG. 4A has been provided, and after on-device NLU and on-device fulfillment have been activated, and a corresponding on-device execution of the fulfillment performed to cause the messaging application to send a reply based on the spoken utterance of FIG. 4A.

FIG. 4B depicts an example of the client device 460 after the spoken utterance 402A of FIG. 4A has been provided, and after on-device NLU and on-device fulfillment have been activated, and a corresponding on-device execution of the fulfillment performed to cause the messaging application 480 to send a reply based on the spoken utterance of FIG. 4A. For example, on-device NLU and/or on-device fulfillment can be activated based at least in part on determining the recognized text conforms to the messaging application 408. For instance, determining the recognized text conforms to an action that is performable by the messaging application 408. In some situations, this can be further based on the messaging application 408 being in the foreground and/or the action, to which the recognized text conforms, being performable at the current state of the messaging application 408.

The on-device NLU can be utilized to process the recognized text and generate NLU data, and the on-device fulfillment can be utilized to generate fulfillment data based on the NLU data. In the example of FIGS. 4A and 4B, the fulfillment data defines that the assistant application should send (directly or via the operating system) a command to the messaging application 408 to cause the reply 408B (FIG. 4B) of "Sounds good" to be generated and sent as a reply in the currently rendered thread. Execution of the fulfillment can occur by sending such a command.

Figure 5A:
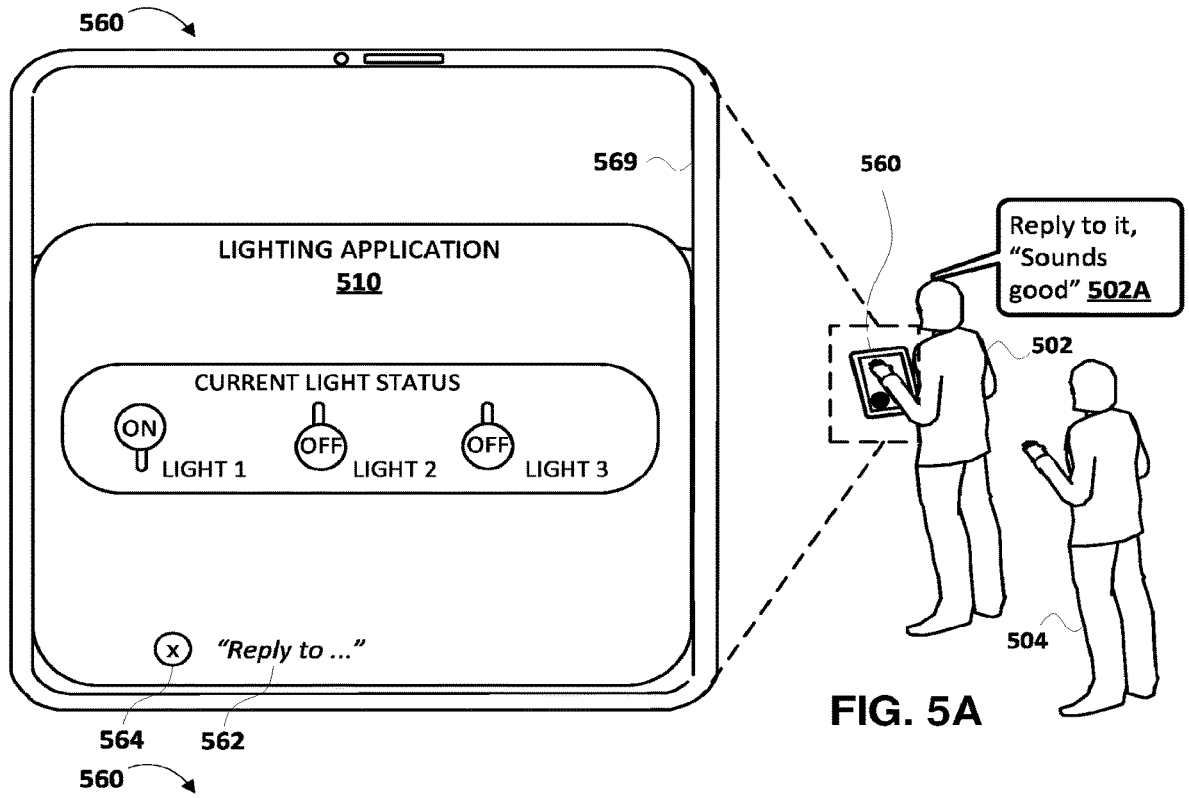
FIG. 5A depicts an example of a client device with a lighting control application in the foreground, a user providing a hot-word free spoken utterance, and activated on-device speech recognition causing a streaming transcription of the spoken utterance to be rendered on a display of the client device.

FIG. 5A depicts an example of a client device 560 with a lighting control application 510 in the foreground, a user 502 providing a hot-word free spoken utterance 502A that is intended for another user 504 (e.g., the utterance 502A may be responsive to the other user 504 asking "what should I say in response to Jane's email?"), and activated on-device speech recognition causing a streaming transcription 562 of the spoken utterance to be rendered on a display 569 of the client device 560. As described herein, various considerations can be considered in determining to activate the on-device speech recognition. Although on-device speech recognition is illustrated in FIG. 5A as being activated, in various implementations it may optionally not be activated and/or streaming transcription 562 not generated. Determining to not activate the on-device speech recognition can be based on one or more considerations. For example, it can not be activated based at least in part on determining directed speech is not occurring (e.g., is not occurring with at least a threshold probability) due to the user 502 actually providing the utterance 502A to the other user 504. As another example, it can not be activated additionally or alternatively based at least in part on determining that two or more users are speaking to each other utilizing TI-SID and/or speaker diarization technique(s). As another example, it can not be activated additionally or alternatively based at least in part on the lighting application 510 being in the foreground and/or no notification being recently received and/or being in the notification bar.

Figure 5B:
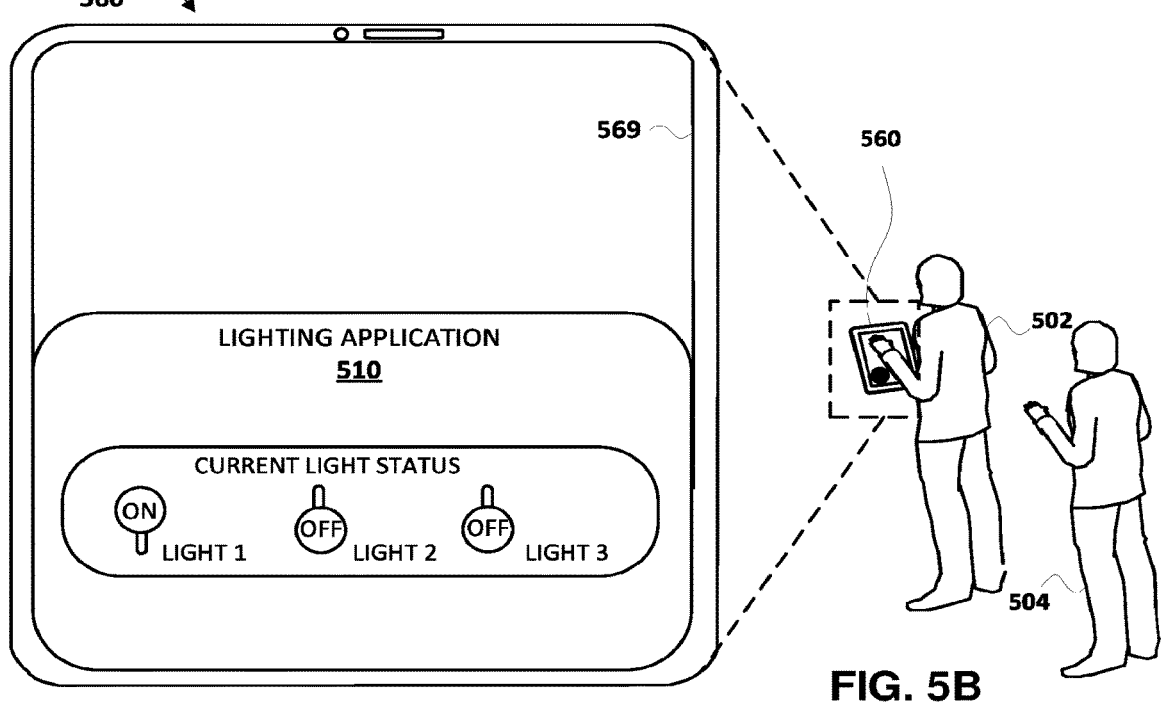
FIG. 5B depicts an example of the client device after the spoken utterance of FIG. 5A has been provided, and after a determination has been made to not activate on-device NLU and/or on-device fulfillment.

FIG. 5B depicts an example of the client device 560 after the spoken utterance 502A of FIG. 5A has been provided, and after a determination has been made to not activate on-device NLU and/or on-device fulfillment. As a result of determining not to activate on-device NLU and/or on-device fulfillment, no fulfillment is performed and the streaming transcription is removed from the display 569. It is noted that the utterance 502A is the same as the utterance 402A of FIG. 4A. However, unlike FIG. 4B, no fulfillment is performed (or even generated) in the example of FIG. 5B. This can be based at least in part on determining the recognized text fails to conform to the lighting application 510 that is executing (whereas it did conform to the messaging application 408 in FIGS. 4A and 4B). For instance, determining the recognized text fails to conform to an action that is performable by the lighting application 510. In some situations, this can be further based on the lighting application 510 being in the foreground and/or the messaging application 408 (or other messaging application) not executing and/or being recently accessed.

Figure 6:
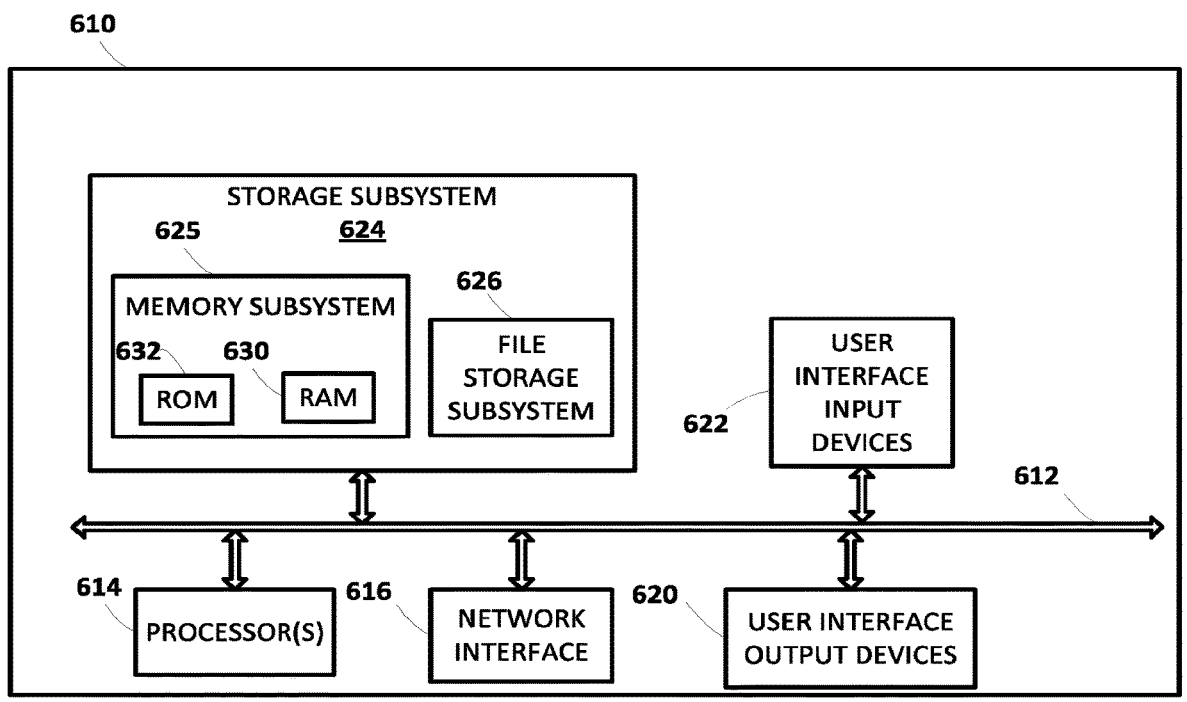
FIG. 6 illustrates an example architecture of a computing device.

FIG. 6 is a block diagram of an example computing device 610 that may optionally be utilized to perform one or more aspects of techniques described herein. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 2, as well as to implement various components depicted in FIGS. 1A, 1B, 2A, 2B, 3A, 3B, 4A, and 4B.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

The above description is provided as an overview of some implementations of the present disclosure. Further description of those implementations, and other implementations, are described in more detail below.

In some implementations, a method is provided that is performed by an automated assistant application of a client device using one or more processors of the client device. The method includes determining to activate on-device speech recognition in response to determining satisfaction of one or more conditions. Determining the satisfaction of the one or more conditions includes determining the satisfaction based on processing of both: hot-word free audio data detected by one or more microphones of the client device, and additional sensor data that is based on output from at least one non-microphone sensor of the client device. The method further includes generating, using the on-device speech recognition, recognized text from a spoken utterance captured by the audio data and/or captured by additional hot-word free audio data detected by one or more of the microphones following the audio data. Generating the recognized text includes performing the on-device speech recognition on the audio data and/or the additional audio data. The method further includes determining, based on the recognized text, whether to activate on-device natural language understanding of the recognized text and/or to activate on-device fulfillment that is based on the on-device natural language understanding. The method further includes, when it is determined to activate the on-device natural language understanding and/or to activate the on-device fulfillment, performing the on-device natural language understanding and/or initiating, on-device, the fulfillment. Further, the method includes, when it is determined to not activate the on-device natural language understanding and/or to not activate the on-device fulfillment, deactivating the on-device speech recognition.

These and other implementations of the technology may include one or more of the following features.

In some implementations, the at least one non-microphone sensor on which the additional sensor data is based may include an accelerometer, a magnetometer, a gyroscope, and/or a laser-based vision sensor.

In some implementations, determining the satisfaction of the one or more conditions based on processing the hot-word free audio data includes processing the hot-word free audio data using an acoustic model to generate a directed speech metric. The acoustic model may be trained to differentiate between spoken utterances that are directed to a client device and spoken utterances that are not directed to a client device. In some of those implementations, determining the satisfaction of the one or more conditions based on processing the hot-word free audio data may further include determining the satisfaction of the one or more conditions based in part on the directed speech metric.

In some implementations, determining the satisfaction of the one or more conditions based on processing the hot-word free audio data may additionally or alternatively include processing the hot-word free audio data using a voice activity detector to detect the presence of human speech, and determining the satisfaction of the one or more conditions based in part on detecting the presence of human speech.

In some implementations, determining the satisfaction of the one or more conditions based on processing the hot-word free audio data may additionally or alternatively include processing the hot-word free audio data using text-independent speaker identification model to generate a voice embedding, comparing the voice embedding to a recognized voice embedding stored locally on the client device, and determining the satisfaction of the one or more conditions based in part on the comparing.

In some implementations, determining, based on the recognized text, whether to activate on-device natural language understanding and/or to activate the on-device fulfillment may include determining whether the text matches one or more phrases stored in a locally stored assistant language model. The locally stored assistant language model may include a plurality of phrases that are each interpretable by an automated assistant.

In some implementations, determining, based on the recognized text, whether to activate on-device natural language understanding and/or to activate the on-device fulfillment may additionally or alternatively include determining whether the text conforms to a predefined assistant query pattern.

In some implementations, determining, based on the recognized text, whether to activate on-device natural language understanding and/or to activate the on-device fulfillment may additionally or alternatively include determining one or more related action phrases based on the one or more related action phrases each having a defined correspondence to a recent action performed, at the client device, responsive to prior user input, and determining whether at least part of the text matches at least one of the one or more related action phrases.

In some implementations, determining, based on the recognized text, whether to activate on-device natural language understanding and/or to activate the on-device fulfillment may additionally or alternatively include determining whether at least part of the recognized text conforms to content being rendered at the client device during the spoken utterance. In some of those implementations, the content being rendered at the client device comprises a graphically rendered suggested automated assistant action.

In some implementations, determining, based on the recognized text, whether to activate on-device natural language understanding and/or to activate the on-device fulfillment may additionally or alternatively include determining, on-device, the fulfillment, and further includes executing the fulfillment on-device. In some of those implementations, executing the fulfillment on-device includes providing a command to a separate application on the client device.

In some implementations, deactivating the on-device speech recognition may include deactivating the on-device speech recognition when it is determined to not activate the on-device natural language understanding and/or the fulfillment, and further based on at least a threshold duration of time passing without further voice activity detection and/or further recognized text.

In some implementations, performing the on-device natural language understanding and/or the on-device fulfillment may include performing the on-device natural language understanding to generate natural language understanding data, and performing the on-device fulfillment using the natural language understanding data.

In some implementations, the method may further include, during generating the recognized text using the on-device speech recognition, causing a streaming transcription of the recognized text to be rendered in a graphical interface at a display of the client device. In some of those implementations, the method may further include, rendering, in the graphical interface with the streaming transcription, a selectable interface element that, when selected, causes the on-device speech recognition to halt. In some of those implementations, the method may further include altering the graphical interface when it is determined to activate the on-device natural language understanding and/or to activate the on-device fulfillment.

In some implementations, a method is provided that is performed by an automated assistant application of a client device using one or more processors of the client device. The method includes determining to activate on-device speech recognition in response to determining satisfaction of one or more conditions. Determining the satisfaction of the one or more conditions includes determining the satisfaction based on processing of: hot-word free audio data detected by one or more microphones of the client device; and/or additional sensor data that is based on output from at least one non-microphone sensor of the client device. The method further includes generating, using the on-device speech recognition, recognized text from a spoken utterance captured by the audio data and/or captured by additional hot-word free audio data detected by one or more of the microphones following the audio data. Generating the recognized text includes performing the on-device speech recognition on the audio data and/or the additional audio data. The method further includes determining, based on the recognized text, to activate on-device natural language understanding of the recognized text, performing the activated on-device natural language understanding of the recognized text, and initiating, on-device, a fulfillment of the spoken utterance based on the on-device natural language understanding.

These and other implementations of the technology may include one or more of the following features.

In some implementations, determining, based on the recognized text, to activate the on-device natural language understanding of the recognized text may include determining whether at least part of the recognized text conforms to content being rendered at the client device during the spoken utterance, and/or determining whether at least part of the text matches one or more related action phrases each having a defined correspondence to a recent action performed, at the client device, responsive to prior user input.

Other implementations may include a computer program including instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a client device having at least one microphone, at least one display, and one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented using one or more processors, the method comprising:
   determining to activate on-device speech recognition at a client device, wherein determining to activate the on-device speech recognition is in response to detecting directed speech, wherein detecting the directed speech comprises:
      detecting, by one or more microphones of the client device, hot word free audio data;
      processing the hot word free audio data using a trained acoustic model to generate a directed speech metric that indicates whether a spoken utterance, that is hot word free and that is captured by the hot word free audio data, is directed to the client device or instead is not directed to the client device, wherein the trained acoustic model is trained to be used in processing corresponding audio data that captures a corresponding hot word free spoken utterance to generate a corresponding directed speech metric that indicates whether the corresponding hot word free spoken utterances is directed to the client device or instead is not directed to the client device;
      detecting the directed speech in response to the directed speech metric satisfying a threshold;
   in response to determining to activate the on-device speech recognition at the client device:
      generating, based on processing the hot word free audio data using the on-device speech recognition, recognized text for the spoken utterance captured by the hot word free audio data and/or captured by additional hot word free audio data detected by the one or more of the microphones following the hot word free audio data;
   determining, based on the recognized text, whether to activate on-device natural language understanding of the recognized text and/or to activate on-device fulfillment that is based on the on-device natural language understanding;
   when it is determined to activate the on-device natural language understanding and/or to activate the on-device fulfillment:
      performing the on-device natural language understanding and/or initiating, the on-device fulfillment.

2. The method of claim 1 wherein the trained acoustic model is trained based on:
   positive training instances that each include:
      positive training instance input of a corresponding directed spoken utterance that is directed to a corresponding client device, and
      positive training instance output that is a first label; and
   negative training instances that each include:
      negative training instance input of a corresponding spoken utterance not directed to any client device, and
      negative training instance output that is a second label.

3. The method of claim 1, wherein determining, based on the recognized text, whether to activate on-device natural language understanding and/or to activate the on-device fulfillment comprises:
   determining whether at least part of the recognized text conforms to content text, the content text being rendered at the client device while the spoken utterance is being spoken.

4. The method of claim 1, wherein determining, based on the recognized text, whether to activate the on-device natural language understanding and/or to activate the on-device fulfillment comprises:
   determining whether at least part of the recognized text conforms to content text, the content text being related to an entity being rendered at the client device while the spoken utterance is being spoken.

5. The method of claim 1, wherein the directed speech metric comprises a probability.

6. The method of claim 1, wherein determining to active the on-device speech recognition is in response to detecting the direct speech and is further in response to detecting an implicit invocation cue via a non-microphone sensor of the client device.

7. The method of claim 6, wherein the implicit invocation cue is user presence within a threshold distance of the client device.

8. The method of claim 7, wherein the non-microphone sensor is a laser-based sensor.

9. The method of claim 6, wherein the non-microphone sensor is an accelerometer, a magnetometer, or a gyroscope.

10. The method of claim 1, wherein determining, based on the recognized text, whether to activate on-device natural language understanding and/or to activate the on-device fulfillment comprises:
    determining whether at least part of the recognized text matches one or more related action phrases each having a defined correspondence to a recent action performed, at the client device, responsive to prior user input.

11. A method implemented using one or more processors, the method comprising:
    determining to activate on-device speech recognition, wherein determining to activate the on-device speech recognition is in response to determining satisfaction of one or more conditions, determining the satisfaction of the one or more conditions comprising determining the satisfaction based on processing of one or both of:
       hot word free audio data detected by one or more microphones of a client device, and
       additional sensor data that is based on output from at least one non-microphone sensor of the client device;
    generating, using the on-device speech recognition, recognized text from a spoken utterance captured by the hot word free audio data and/or captured by additional hot word free audio data detected by one or more of the microphones following the hot word free audio data, generating the recognized text comprising performing the on-device speech recognition on the hot word free audio data and/or the additional hot word free audio data;
    determining that at least part of the recognized text that was generated using the on-device speech recognition conforms to actions performable by an application currently executing in a foreground of the client device while the spoken utterance is being spoken;
    determining, based on the recognized text conforming to actions performable by the application currently executing in the foreground, to activate on-device natural language understanding of the recognized text that was generated using the on-device speech recognition;
    performing the activated on-device natural language understanding of the recognized text; and
    initiating, on-device, a fulfillment of the spoken utterance based on the on-device natural language understanding.

12. The method of claim 11, wherein the application currently executing in the foreground is a non-automated assistant application.

13. The method of claim 11, further comprising:

actively soliciting the application currently executing in the foreground to determine, responsive to the actively soliciting, the actions performable by the application.

14. The method of claim 13, wherein the actively soliciting is performed via an operating system of the client device.

15. The method of claim 13, wherein the application currently executing in the foreground is a non-automated assistant application.

16. The method of claim 11, wherein determining the satisfaction of the one or more conditions comprises determining, based on processing the hot word free audio data, that the hot word free audio data includes directed speech that is directed to the client device as opposed to not being directed to the client device.

17. The method of claim 16, wherein determining, based on processing the word hot word free audio data, that the hot word free audio data includes the directed speech comprises:

processing the hot word free audio data using a trained acoustic model to generate a directed speech metric; and determining that the hot word free audio data includes the directed speech in response to the directed speech metric satisfying a threshold.

18. The method of claim 17, wherein determining the satisfaction of the one or more conditions further comprises determining, based on the additional sensor data that is based on output from the at least one non-microphone sensor, satisfaction of an additional condition.

* * * * *